(No Model.)  2 Sheets—Sheet 2.

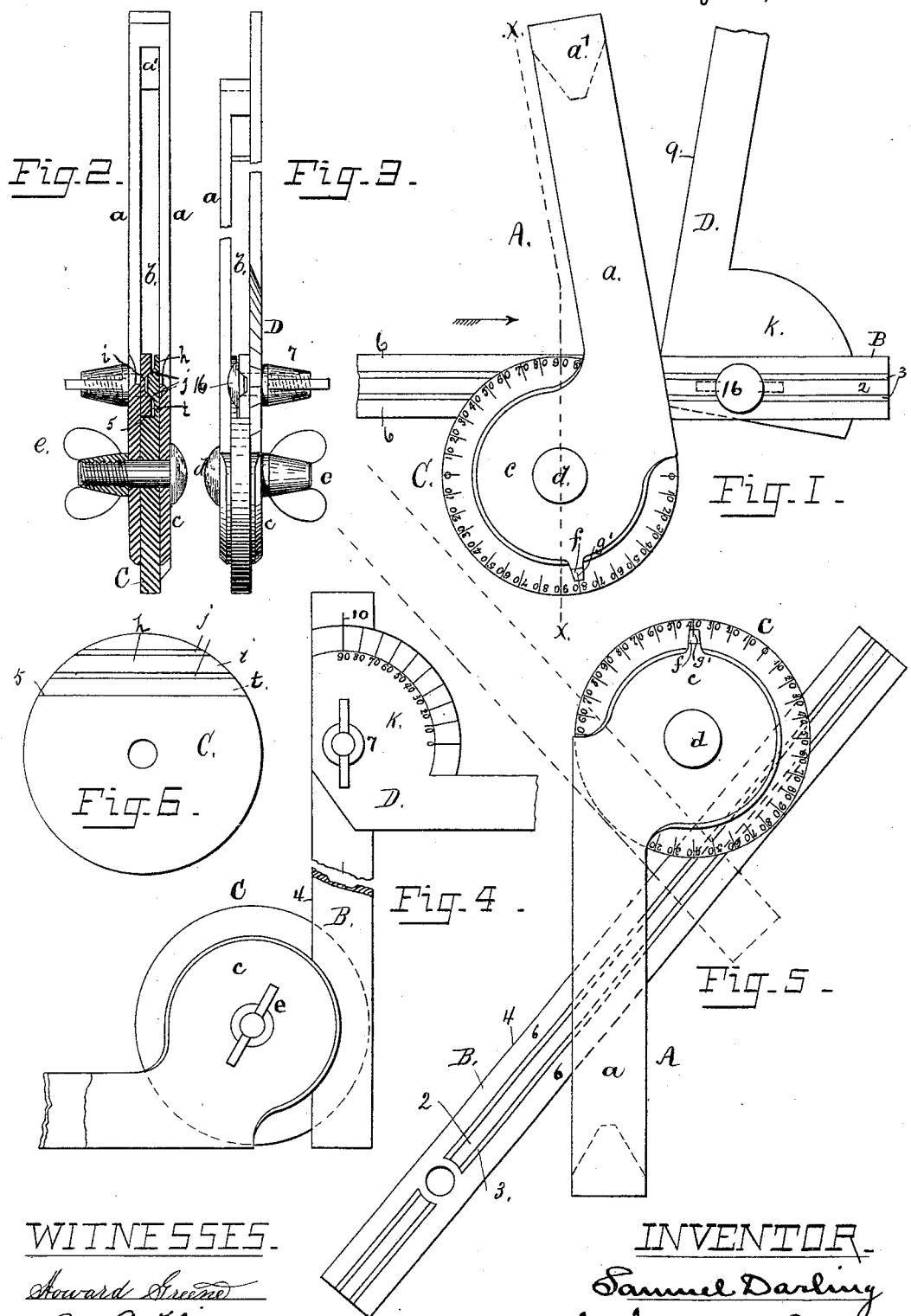

S. DARLING.
BEVEL AND PROTRACTOR.

No. 366,651. Patented July 19, 1887.

WITNESSES.
A. A. Fleming
Howard Greene

INVENTOR.
Samuel Darling.
by Gregory & Sange
attys.

UNITED STATES PATENT OFFICE.

SAMUEL DARLING, OF PROVIDENCE, RHODE ISLAND.

BEVEL AND PROTRACTOR.

SPECIFICATION forming part of Letters Patent No. 366,651, dated July 19, 1887.

Application filed March 8, 1886. Serial No. 194,365. (No model.)

*To all whom it may concern:*

Be it known that I, SAMUEL DARLING, a citizen of the United States, and a resident of the city and county of Providence and State of Rhode Island, have invented an Improvement in Bevel-Protractors, of which the following description, in connection with the accompanying drawings, is a specification, like letters on the drawings representing like parts.

The object of my invention is to produce an instrument which can be adjusted to any angle from zero to ninety degrees, and by it the same be transferred in the various ways required in the use of such instruments; also, an instrument which can be adjusted to any angle, exterior or interior, to test or transfer the same, as may be required; also, an instrument which can be adjusted to two different angles at the same time, both interior and exterior, or one interior and one exterior; also, an instrument that may be used as a try-square for testing interior or exterior angles; also, an instrument constructed in a more substantial, durable, and accurate manner than other instruments of the kind heretofore made.

The invention is hereinafter fully described, and particularly pointed out in the claims.

Figure 7:
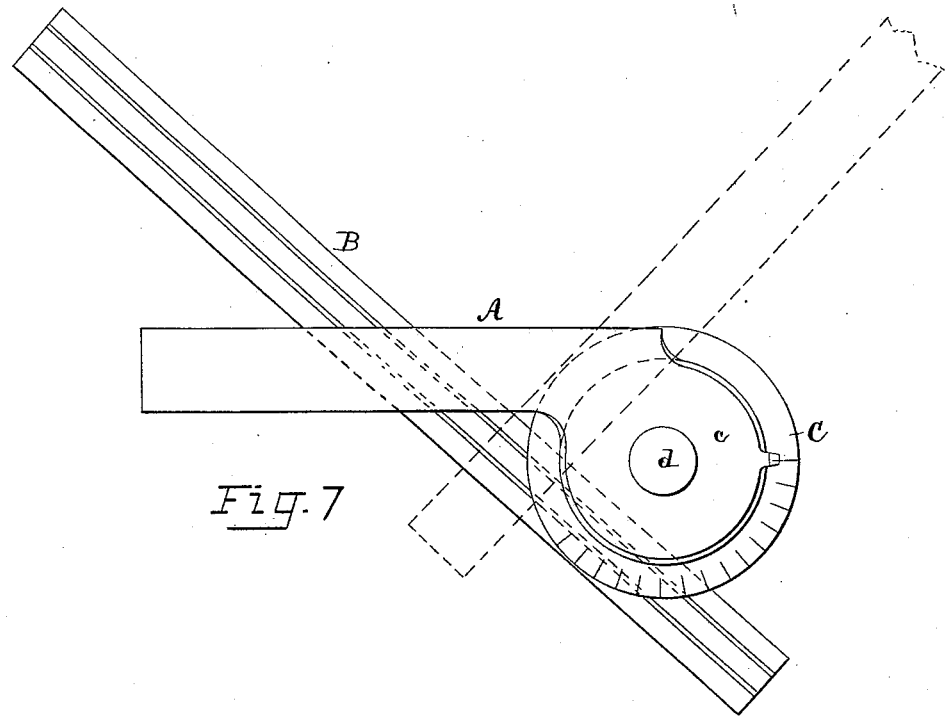
Figure 8:

Figure 1 represents, in plan view, a bevel-protractor embodying my invention; Fig. 2, a section thereof, partly in elevation, on the line *x x*, Fig. 1. Fig. 3 is an end elevation of Fig. 1, looking in the direction of the arrow. Fig. 4 is an elevation of my improved bevel-protractor, partly broken away to show the blade with its arm in different position with relation to the slotted head than that shown in Fig. 1. Fig. 5 is a similar view showing the blade in still another relation to the slotted head, the arm being removed from the blade. Fig. 6 is a plan view of the disk, to show more clearly the cut-away portion and rib, to be referred to. Figs. 7 and 8 are views of a modification to be referred to.

The head A is shown in the present instance as being composed of two plates, *a*, parallel with each other and joined or united at one end, as at *a'*, to provide the slot *b* between said plates. The plates are preferably provided at one end with enlargements or ears *c*, to receive the plate or blade-carrier, shown in this instance as a disk, C, pivoted between said ears by the pivot or screw *d*, having the thumb-nut *e*, which enables the ears of the plates to be pressed against the intermediate blade-carrier or disk C, capable of rotation on the pivot-screw *d*, and bind said disk between the ears or enlargements *c*, to prevent rotation or movement thereof when desired. In this instance I have preferably shown the disk C as having a scale on one of its faces and near the periphery, to act in conjunction with a pointer, *f*, having a degree mark, *g'*, on the contiguous plate or ear of the slotted head, while the opposite face of said disk has a segmental cut-away portion, *h*, provided with a groove, *t*, having a beveled side, *j*. The cut-away portion *h* receives the blade B, in one face of which is a groove, 2, with a beveled side, 3, thus forming between the groove 2 and the edge 4 of the blade a longitudinal rib, 6, which is adapted to fit in the groove *t* of the disk C or blade-carrier. The extreme outer portion of the segmental recess *h* is preferably cut away to the depth of the groove *t*, so as to form a rib, *i*, which is beveled upon the outer side to correspond with the bevel of the side 3 of the groove, in order that the rib may fit the groove 2 of the blade, and the opposite edges of the blade be also used interchangeably in the groove *t* of the carrier-disk, and by forming the rib *i* in the segmental recess *h*, I am enabled to employ a narrow groove, 2, in the blade, and to form equal interchangeable ribs 6 at the opposite edges of the same.

It will be noticed in this instance that the blade B is retained in sliding connection with the disk C by one of the plates *a*, or its ear lapping over the cut-away portion of the disk to engage the back of the blade B, as clearly indicated in Figs. 2 and 4 of the drawings. By this means it will be noticed that the blade can be moved longitudinally with relation to the disk C, so as to be passed into the slotted head and project therefrom at its back, as clearly indicated in Fig. 5, to obtain angle measurements with said head and blade. The blade B is provided with an arm, D, pivoted thereto by the screw 16 and thumb-nut 7, the said arm having a quadrant, *k*, graduated on one side. The arm D is preferably secured to the blade B at its back, or to that face not having the groove 2, so that when said arm is brought into a position with relation to the slotted head, like that shown in Fig. 1 or in a similar position, the edge 9 of the said arm D is brought opposite to the contiguous edge of one of the plates $a$ of the slotted head, as indicated in Figs. 1 and 3, whereby any desired angle tapering to a point may be obtained; or, further, devices or objects of a tapering form, such as a gear-tooth, for instance, may be accurately measured.

The blade B, provided with the arm D, having the quadrant $k$ operating in connection with the graduated revoluble disk or blade carrier C, pivoted to a head, enables this instrument to be used for a variety of purposes and to ascertain a great number of angle measurements required in metal working that cannot be obtained by the employment of the common beveled protractors of well-known construction.

To ascertain measurements by this instrument when the arm D is employed, the blade B is set at the proper angle with relation to the head A, which may be ascertained by the scale-marks on the revoluble blade carrier or disk C, and the thumb-screw $e$ tightened to firmly hold the parts in adjusted position, whereupon the arm D may then be set at the proper angle with relation to the blade B, ascertainable by the graduated quadrant $k$, in conjunction with the pointer 10 on said blade B, when the said arm may be retained in adjusted position on the blade by adjusting the thumb-nut 7. One such adjustment is shown in Fig. 4 of the drawings.

In Figs. 7 and 8 I have shown the head or stock as consisting of one plate only, which is used in connection with the washer or plate 12 to enable the revoluble blade-carrier to be properly held in engagement with the head.

It is apparent that without departing from the spirit of my invention the revoluble blade-carrier may be connected with the head or stock at any point other than at one end thereof, as shown in the drawings, while instead of the particular form of groove 2 and rib $i$ shown other well-known means may be employed to effect the same purpose. For example, both sides of the groove in the blade may rest on the sides of the rib and the blade be wholly guided by it without the edge of the tongue bearing against the shoulder; and it is evident also that the method herein described of securing the blade to the blade-carrier may be applied to any try-square having an adjustable blade, the groove or grooves and rib being made on the stock, instead of a separate blade-carrier.

I claim—

1. A bevel, bevel-protractor, or adjustable try-square having a cut-away portion or recess and an adjustable blade, one edge of which is forced and held against the shoulder in the recess by means of a clamp and the wedging of opposite bevel-surfaces, substantially as described.

2. A bevel, bevel-protractor, or adjustable try-square having a blade-holding stock or carrier provided with a cut-away portion or recess having a groove with a beveled side, and a blade provided with a longitudinal rib adapted to fit the groove in the cut-away portion or recess, and means for clamping the rib of the blade in the said groove, substantially as described.

3. A bevel, bevel-protractor, or adjustable try-square having a blade-holding stock or carrier provided with a cut-away portion or recess having a groove with a beveled side, and a blade provided with longitudinal ribs at its opposite edges which are adapted to fit the groove in the cut-away portion interchangeably, and means for clamping the rib of the blade in the said groove, substantially as described.

4. A bevel or bevel-protractor or adjustable try-square having in combination a head or stock, a revoluble blade-carrier fitted to the stock with a central pivot or shaft, and an adjustable blade held at one edge in a segmental recess and holding-groove at the side of the blade-carrier, with the opposite edge of the blade extending continuously beyond the periphery of the carrier, substantially as described.

5. A bevel, bevel-protractor, or adjustable try-square having a head or stock, a revoluble blade-carrier pivoted to said stock and provided with an adjustable blade having an arm pivoted thereto, substantially as described.

6. A bevel, bevel-protractor, or adjustable try-square having a head or stock, a revoluble blade-carrier pivoted to said stock and provided with an adjustable blade having an arm pivoted thereto, the said arm being provided with a graduated quadrant, as and for the purpose set forth.

7. A bevel, bevel-protractor, or try-square having in combination a double or slotted head or stock, a revoluble blade-carrier graduated on the side opposite to the blade and pivoted in the slot of the head with a central pivot or shaft, and an adjustable blade held at one edge in a segmental recess and holding-groove at the side of the carrier, the opposite edge extending beyond the periphery of the said carrier, substantially as described.

8. A bevel, bevel-protractor, or adjustable try-square having a double or slotted head provided with the enlargements or ears, a revoluble blade-carrier pivoted between said ears of the slotted head, the said blade-carrier having graduations on one of its faces and a segmental recess and groove on its other face, and a blade fitting said recess and provided with a longitudinal rib fitting the groove in the recess, the said blade being retained in the recess of the carrier by one of the ears of the slotted head, and means, substantially as described, to bind the blade-carrier and blade in adjusted position in the slotted head, as and for the purpose set forth.

9. A bevel, bevel-protractor, or try-square having a double slotted head or stock, a blade having parallel ribs at its opposite edges, and a revoluble arm attached to the blade by means of a pivot-bolt and nut, a graduated revoluble blade-carrier pivoted in the slot at one end of the stock and provided with a segmental recess and a groove, one of the sides of the groove and of the rib of the blade being beveled and so arranged that when the two parts of the head are drawn together by the pivot-bolt and nut one edge of the blade will be forced against the shoulder of the segmental recess, thus securing great accuracy and permanency, substantially as described.

In testimony whereof I have signed my name to this specification in the presence of two subscribing witnesses.

SAML. DARLING.

Witnesses:
 HOWARD GREENE,
 JAS. H. LANGE.